Feb. 21, 1933.  J. W. PETERSON  1,898,310
BRAKE SHOE
Filed Aug. 2, 1930

INVENTOR.
JOHN W. PETERSON
BY
ATTORNEY

Patented Feb. 21, 1933

1,898,310

UNITED STATES PATENT OFFICE

JOHN W. PETERSON, OF SOUTH BEND, INDIANA, ASSIGNOR TO BENDIX BRAKE COMPANY, OF SOUTH BEND, INDIANA, A CORPORATION OF ILLINOIS

BRAKE SHOE

Application filed August 2, 1930. Serial No. 472,521.

This invention relates to brakes, and is illustrated as embodied in shoes for an internal expanding automobile brake.

An object of the invention is to provide an inexpensive and very strong shoe having a friction lining of the cast or molded type, preferably of metal such as bronze, aluminum alloy, or cast iron. According to an important feature of the invention, the lining is stiffened by a web, which may be a steel stamping and which is preferably arranged centrally of the shoe, and which has a portion permanently embedded in the lining, for example by casting or molding the lining on the web.

The above and other objects and features of the invention, including various novel and desirable details of construction, will be apparent from the following description of several illustrative embodiments shown in the accompanying drawing, in which.

Figure 1:
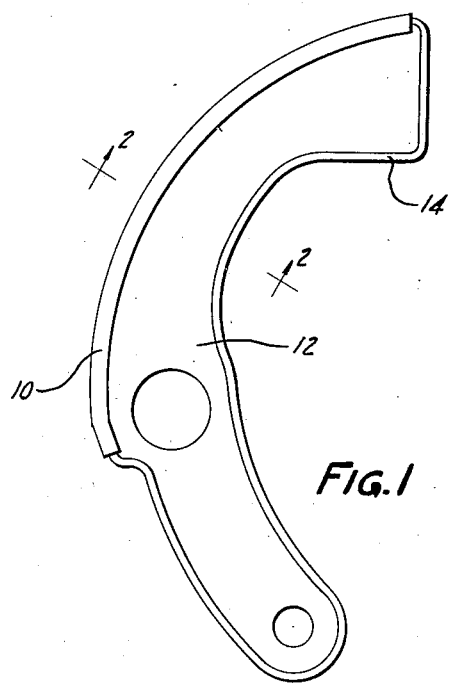
Figure 1 is a side elevation of one form of shoe.
Figure 2:
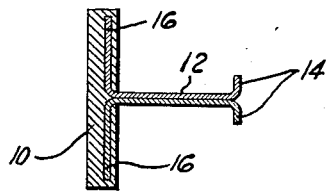
Figure 2 is a section through the shoe of Figure 1, on the line 2—2 of Figure 1.

Each of the shoes includes a cast or molded friction lining 10, preferably of bronze or aluminum alloy or cast iron or other metal. The shoe of Figures 1 and 2 is provided with a centrally-arranged stiffening web 12, thus forming a shoe substantially T-shaped in cross-section. The web 12 is built up of two L-section stampings welded back to back, and having strengthening flanges 14 at their inner edges and oppositely-directed flanges 16 at their outer edges embedded in the lining 10. The web is preferably extended at one end beyond the friction lining to form an anchor arm and at its other end is formed for engagement with an applying device, all as clearly disclosed in Figure 1. The lining 10 preferably completely surrounds the flanges 16 and is contiguous with the central web 12 for supporting and strengthening the web portion of the shoe especially the form built up from L sections.

Figure 3:
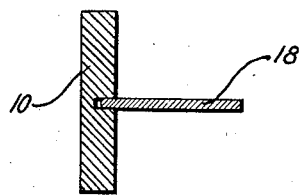
Figures 3, 4, and 5 are sections through different shoes, and corresponding to Figure 2.
Figure 5:
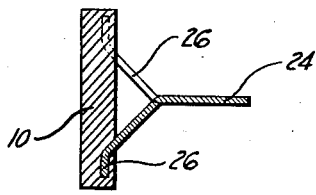
Figure 4:
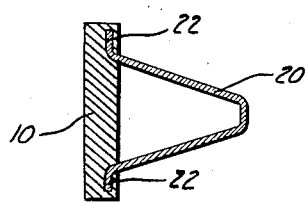

The shoe of Figure 3 has a simple flat web 18 with its outer edge embedded in the lining 10. In Figure 4, the shoe has a channel-section web 20, with flanges 22 embedded in the lining 10. In Figure 5, the web 24 is slotted from its outer edge to form tongues 26 bent alternately in opposite directions and embedded in the lining.

While several illustrative embodiments have been described in detail, it is not my intention to limit the scope of the invention to those particular embodiments, or otherwise than by the terms of the appended claims.

I claim:

1. A brake shoe for internal expanding automobile brakes comprising a molded, convex portion adapted to engage the inner surface of a brake drum, and a web member extending radially inward from said drum-engaging portion and being provided with flanges permanently embedded in said drum-engaging portion, one end of said web member extending beyond said drum-engaging portion in substantially circumferential alignment therewith and being provided with means whereby said brake shoe may be anchored, and means at the other end of said web member for engagement by applying means.

2. A brake shoe for internal expanding automobile brakes comprising a molded, convex portion adapted to engage the inner surface of a brake drum, and a channel-shaped web member extending inwardly from said drum-engaging portion and being provided with flanges permanently embedded in said drum-engaging portion, one end of said web member extending beyond said drum-engaging portion in substantial circumferential alignment therewith and being provided with means whereby said brake shoe may be anchored, and means at the other end of said web member for engagement by applying means.

3. A brake shoe for internal expanding automobile brakes comprising a molded, convex portion adapted to engage the inner surface of a brake drum, and a web member having oppositely struck integral tongues ending in flanged portions, said flanged portions being permanently embedded in said drum-engaging portion, one end of said web member extending beyond said drum-engaging portion in substantial circumferential alignment therewith and being provided with means whereby said brake shoe may be anchored, and means at the other end of said web member for engagement by applying means.

In testimony whereof, I have hereunto signed my name.

JOHN W. PETERSON.